Nov. 29, 1966  P. M. ERLANDSON  3,288,006
MAGNETIC IMPULSE SCORING AND/OR CUTOFF
OR ELECTRICALLY CONDUCTIVE SECTIONS
Filed Aug. 14, 1963  3 Sheets-Sheet 1
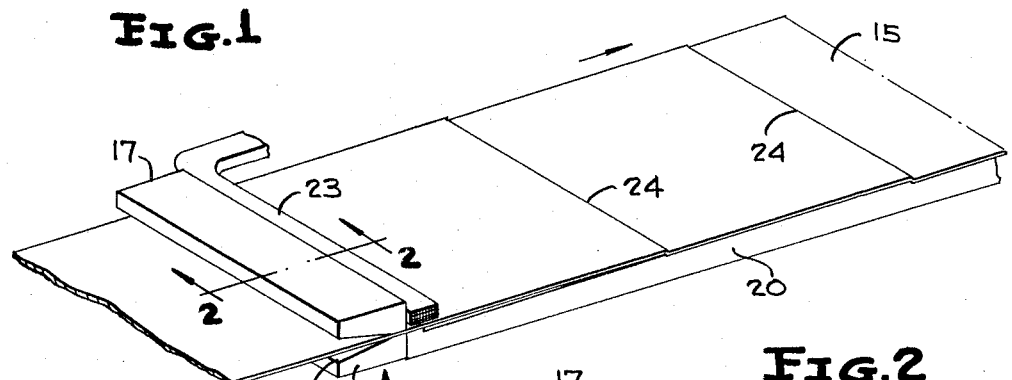
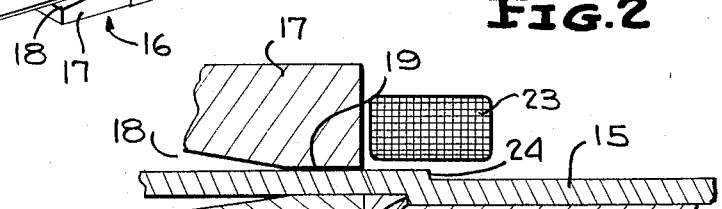
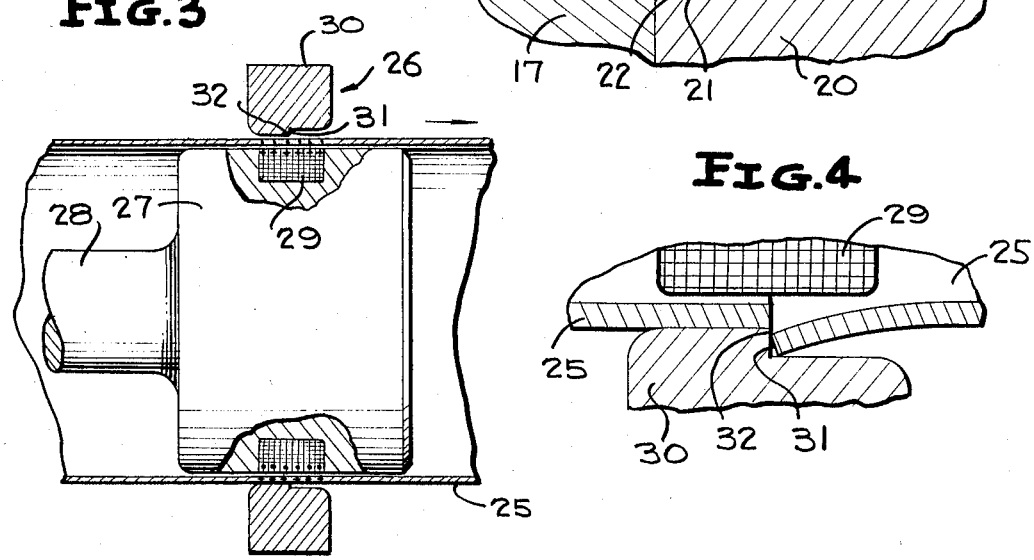
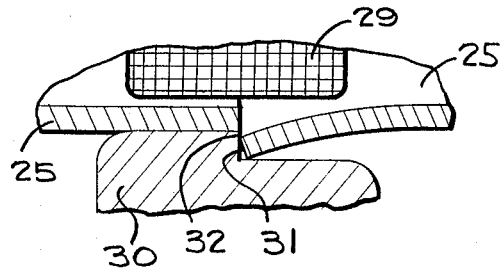
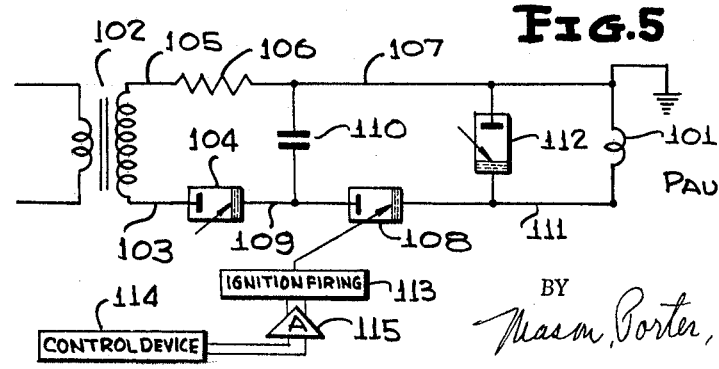
INVENTOR
PAUL M. ERLANDSON

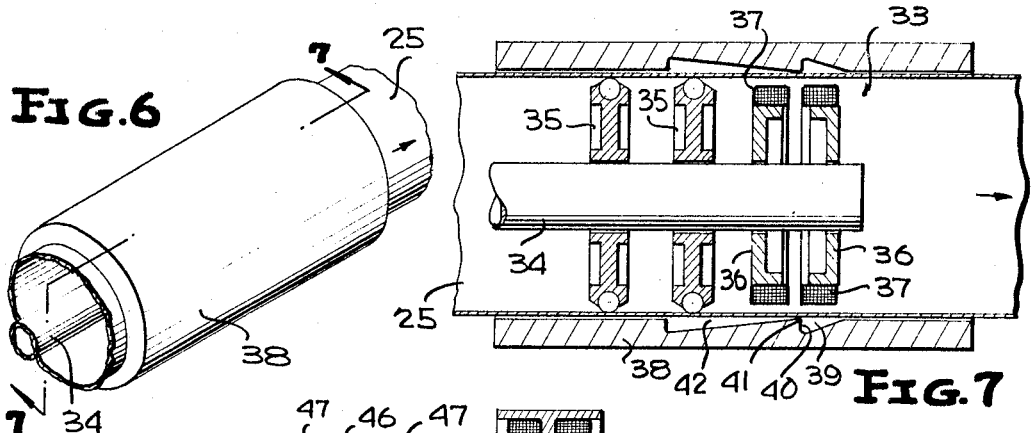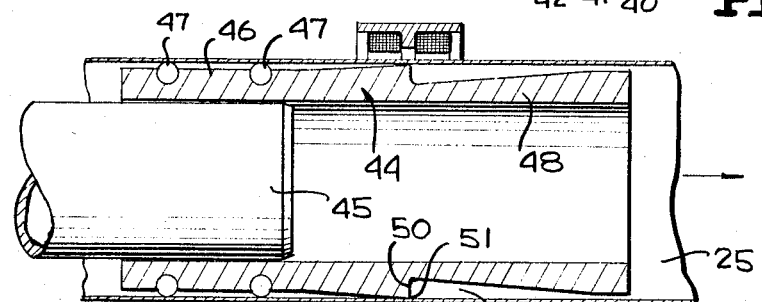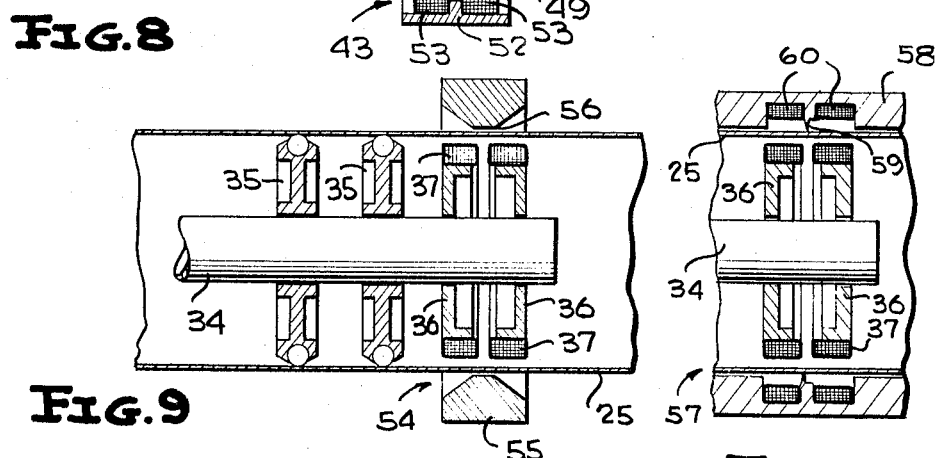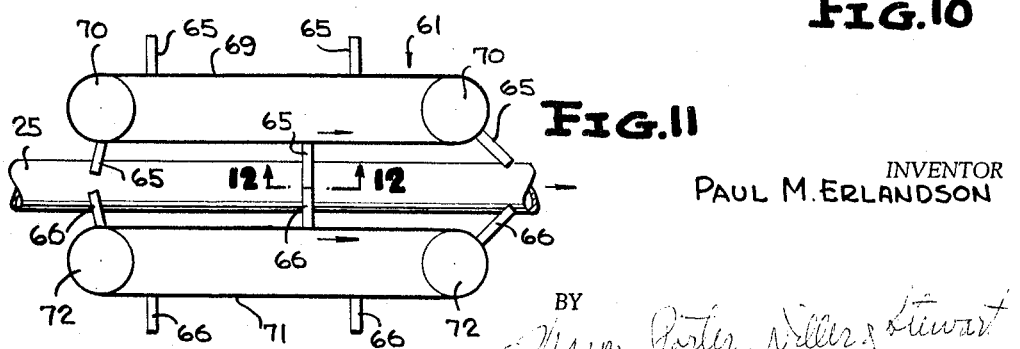

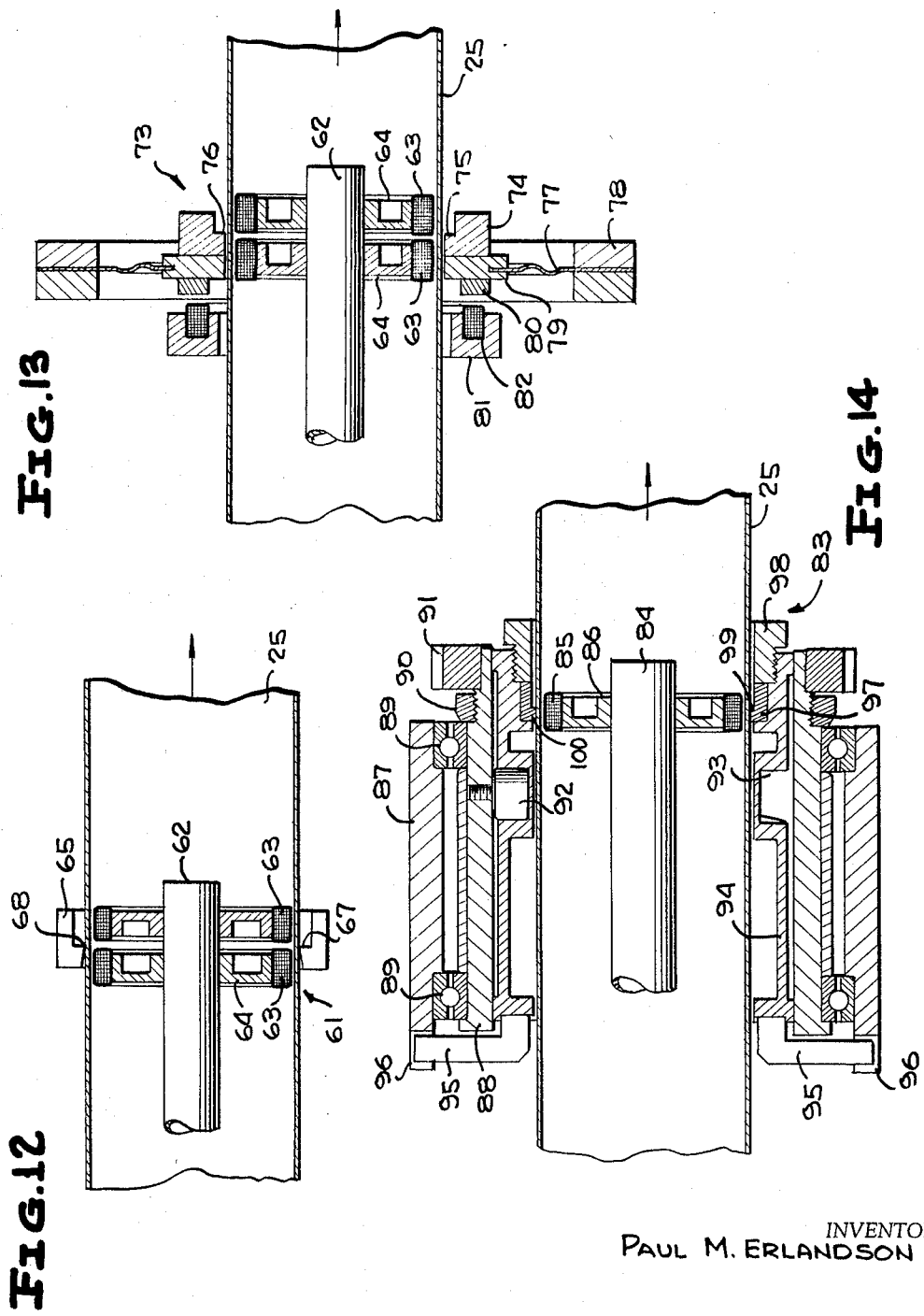

United States Patent Office 3,288,006
Patented Nov. 29, 1966

3,288,006
MAGNETIC IMPULSE SCORING AND/OR CUTOFF OF ELECTRICALLY CONDUCTIVE SECTIONS
Paul M. Erlandson, Palos Park, Ill., assignor to Continental Can Company, Inc., New York, N.Y., a corporation of New York
Filed Aug. 14, 1963, Ser. No. 302,021
27 Claims. (Cl. 83—6)

This invention relates in general to means for effecting a scoring or severing operation on a high speed moving element, and more particularly relates to a novel magnetically operated device for the high speed selective registered scoring or cutoff of moving conductive strip or tube. It is to be understood that when reference is made hereinafter to the term conductive, it is to be understood that the term has reference to electrical conductivity. It is also to be understood that the principles of this invention can be applied to any geometry of material such as a flat strip, a cylindrical tube, an elliptical tube, and the like.

At the present time a wide variety of methods are available for cutting off moving materials. For example, in the manufacture of composite containers a saw blade having a motion following that of a rotating tube is used. In the manufacture of furniture tubing in a continuous forming process, it is usual to pack off lengths of tubing by hand with large hand cutters wherein the operator follows the progress of the tubing by eye as best he can, and snips off the approximate length of the tubing desired. Numerous other means are provided for cutting off tubing, including initially weakening the material of the tubing in the flat state and then breaking off or electrically separating the tubing into individual lengths. These and other prior art practices all suffer from the following major differences:

(1) In general they are not capable of operating on tubing moving at very high speeds, for example from 100 to 5000 feet per minute.

(2) In general these methods cause physical damage to either strip or tubing, particularly thin gauge materials, adjacent to the cut. This damage may include tearing, bending, dimpling or excessive cold working of the material.

(3) One conventional method for cutting off flat strip involves the use of so-called flying shears, wherein a knife action is synchronized with the motion of a continuously moving strip. In general the moving portion of the mechanism is massive, and capable only of limited speeds.

(4) In any of the foregoing methods difficulties are experienced when it is desired to achieve very precise registration—that is, to cut off either strip or tubing at a precisely determined place, such as might be occasioned by the cutoff of strip which is already printed or decorated with a specified pattern, where it might be desired to cut off the material along a registration mark.

(5) In view of the inability to cut along precisely predetermined lines, it is sometimes necessary to produce scrap, by allowing margins which are later trimmed from the material.

In view of the foregoing, a primary object of this invention is to provide a method of and apparatus for accurately cutting tubing at extremely high speeds.

Another object of this invention is to provide a novel method and apparatus for cutting or scoring material moving at high speeds at precisely determined locations.

Still another object of this invention is to provide a novel apparatus for cutting highly moving material in a manner wherein scrap is eliminated in the cutting operation.

A still further object of this invention is to provide a novel method for forming articles having trimmed edges which are extremely smooth and which are free from cracks or work hardening inherent in present methods such as the deformation of the material which might be cut by a saw blade or similar cutting devices where multiplicity of cutting edges are used.

It is to be understood that during a normal cutting operation a large amount of heat is generated and that this heat results in the localized heating of portions of cutting edges to a high temperature during cutting which results in the deterioration of the cutting edges of the necessity for repeated renewing of the cutting edges. In view of this, it is another object of this invention to provide a novel method of cutting material wherein the motional requirements of the cutting edge of a cutter are minimized and it is possible to use extremely hard materials for cutting edges which will not deteriorate rapidly as in the case of other materials and wherein the cutting operation is instantaneous so as to minimize the amount of heat generated during the cutting operation.

There has been recently developed a method of forming conductive materials by means of magnetic impulse. It is the proposal of this invention to utilize the broad principal of magnetic forming in conjunction with dies and other shear force producing means wherein the magnetic impulse may produce a selected scoring or cutting of material at a very high rate so that it is possible to effect the scoring or cutting off of moving conductive material utilizing stationary cutoff means.

Another object of this invention is to utilize the principles of magnetic impulse to rapidly move a moving element generally normal to the direction of movement and in cooperation with shear producing means wherein the time required for scoring or cutoff is extremely short and the necessary movement of the shear producing means with the moving material is restricted to a very short time interval and thus a very short distance even though the moving material may be moving at a very high speed.

A further object of this invention is to provide a novel article formed by a cutting operation wherein the cut edges of the article are straight and smooth as compared to the normal ragged or burred edge and wherein the article has been accurately cut as to length and when the article has been previously decorated or otherwise initially modified to determine the proposed boundaries of the article, the article is accurately cut in relation to the decoration, along the prescribed boundaries.

Still another object of this invention is to provide a novel tubular member having clearly and sharply cut edges wherein due to the absence of irregularities in the cut edges, the tubular member is adaptable to much better flangibility than previously formed similar tubular members.

With the above and other objects in view that will hereinafter appear, the nature of the invention will be more clearly understood by reference to the following detailed description, the appended claims and the several views illustrated in the accompanying drawings.

In the drawings:

FIGURE 1 is a perspective view of an apparatus for the transverse scoring of a moving flat sheet or strip in accordance with this invention.

FIGURE 2 is an enlarged fragmentary longitudinal sectional view taken generally along the line 2—2 of FIGURE 1 and shows in detail the scored configuration of the strip.

FIGURE 3 is a fragmentary longitudinal vertical sectional view taken through a moving tube and shows the same associated with magnetic impulse cutoff means formed in accordance with this invention.

FIGURE 4 is an enlarged fragmentary vertical sectional view of the lower portion of the magnetic impulse cutoff means of FIGURE 3 and shows the moving tube immediately subsequent to the performing of a cutting operation thereon.

FIGURE 5 is a wiring diagram showing an assembled circuit for effecting the momentary energization of a coil utilized for producing the magnetic impulse in a conductive member in accordance with this invention.

FIGURE 6 is a fragmentary perspective view of a moving tube showing the same passing through a modified form of magnetic cutoff device.

FIGURE 7 is an enlarged fragmentary longitudinal vertical sectional view taken through the magnetic impulse cutoff device of FIGURE 6 along the line 7—7 of FIGURE 6 and shows more specifically the details thereof.

FIGURE 8 is an enlarged fragmentary longitudinal vertical sectional view similar to FIGURE 7 and shows another form of cutoff device which is substantially the reversal of that shown in FIGURE 7.

FIGURE 9 is a longitudinal vertical sectional view taken through still another form of magnetic impulse cutoff device wherein opposed impulses are imparted to a conductive member for the purpose of effecting shearing forces therein of a degree which will effect the severing of the conductive member without the use of an anvil and without touching any portion of the cutoff device.

FIGURE 10 is a longitudinal sectional view taken through still another form of magnetic impulse cutoff device which is similar to that shown in FIGURE 9, but incorporates an anvil.

FIGURE 11 is a plan view of a magnetic impulse cutoff device wherein anvils thereof are movable together with the tubing and at the same speed of the tubing so that at the time of cutoff, there is no relative movement between the tubing and the anvils.

FIGURE 12 is an enlarged fragmentary longitudinal vertical sectional view taken substantially along the line 12—12 of FIGURE 11 and shows the specific relationship of an anvil half with respect to fixed coils disposed within the moving tube.

FIGURE 13 is a vertical sectional view similar to FIGURE 12 and shows a form of cutoff device wherein the moving anvil is supported by a diaphragm and is reciprocated by means of a coil.

FIGURE 14 is a longitudinal vertical sectional view showing still another form of cutoff device having a moving anvil with the anvil being reciprocated by means of a rotary cam arrangement.

Referring now to the drawings in detail, reference is first made to FIGURES 1 and 2 wherein there is illustrated a moving sheet or strip 15 which is being scored at spaced intervals in accordance with this invention through the use of a scoring device generally referred to by the numeral 16. The scoring device 16 includes a suitable sheet guide 17 having a tapered entrance opening 18 leading into a narrow guideway 19 (FIGURE 2). Immediately adjacent the sheet guide 17 there is a combined anvil and sheet support 20 which includes a step 21 in part defining an upper sharp scoring edge 22. A coil 23 overlies the step 21 and the edge 22 with the coil 23 being formed in a manner to receive a rapid flow of high voltage current therethrough. During the rapid flow of current through the coil 23, a magnetic field is formed surrounding the coil 23. At the same time, since the sheet or strip 15 is formed of an electrically conductive material, current is induced into the strip 15 in a manner to produce a repelling magnetic field so that momentarily the strip 15 is repelled from the coil 23 by the reacting magnetic forces at a relatively high speed and pressure. This sudden repulsion of the strip 15 with respect to the coil 23 results in the movement of the strip 15 downwardly to conform to the configuration of the upper surface of the anvil 20 and with a shearing stress being produced in that portion of the strip 15 engaging the edge 22. As a result, the strip 15 is provided with a transversely extending stepped type of score 24 and the strip 15 is thus so weakened for easy tearing or shearing in a subsequent operation.

A typical use of the strip 15 after having been scored utilizing the scoring device 16 is in the forming of individual tubular members wherein the strip is first shaped and welded to form a continuous tube having a welded seam, after which the strip is broken along the score line into uniform lengths. Although the cross section shown in FIGURE 2 indicates that the step 21 is of a constant height throughout, it is to be understood that the height of the step 21 may be varied so as to vary the effective depth of the scoring or offsetting of the strip 15 so that the tearing or breaking of a tube formed utilizing the scored strip 15 may be progressive.

Referring now to FIGURE 3 in particular, it will be seen that there is illustrated a cutoff device for cutting a moving tube 25 into predetermined lengths. The cutting off of the moving tube 25 is accomplished by means of a magnetic impulse cutoff device, generally referred to by the numeral 26. The cutoff device 26 includes a suitable support 27 carried by a horn extension 28 which would normally be a portion of a horn of a tube forming mechanism (not shown). The coil support 27 carries a coil 29 of a type adapted to receive a sudden flow of high voltage current therethrough so as to set up a magnetic field.

The cutoff device 26 also includes a ring type anvil 30 of a stepped construction including a step 31 which faces generally in the direction of movement of the tube 25 and which terminates at its inner edge in an annular cutting edge 32.

It is to be understood that the coil 29 is disposed close to the inner surface of the tube 25 and the anvil 30 is disposed close to the outer surface of the tube 25. The tube 25 may be guided with respect to the coil 29 and the anvil 30 in any desired manner. At a predetermined interval the coil 29 is energized by the passage of current therethrough with the result that a magnetic field is set up by the coil 29 and current is induced into the tube 25 which is formed of an electrically conductive material. The current induced into the tube 25 sets up a second magnetic field which is in repelling relation with respect to the magnetic field of the coil 29 so that the tube 25 is repelled by the coil 29. The coil 29 being annular, the repulsion of the tube 25 with respect to the coil 29 results in a slight outward expansion of the tube 25 at a very high rate and under sufficiently high pressure to effect the shearing of the tube 25 along the cutting edge 32 with the result that a length of the tube 25 is cutoff in the manner shown in FIGURE 4.

In FIGURES 6 and 7 there is illustrated a modified form of magnetic impulse cutoff device for cutting off the tube 25, the cutoff device being generally referred to by the numeral 33. The cutoff device 33 includes a suitable support shaft 34 which may be an extension of the tube forming horn of the tube forming apparatus (not shown). The support 34 supports a pair of bearing members 35 which are spaced longitudinally of the support 34 and engage the inner surface of the tube 25 to accurately position the same relative to the support 34.

The support 34 also carries a pair of coil supports 36 on which there are mounted annular coils 37. The coils 37 are disposed in closely spaced relation longitudinally of the support 34.

The cutoff device 33 also includes an annular die member 38 which is recessed at 39 to define an annular step 40 which terminates at its inner end in an annular cutting edge 41. The inner surface of the anvil 38 is also relieved at 42 on the opposite side of the cutting edge 41.

At this time it is pointed out that the support 34 is preferably of a tubular construction and may provide coolant in any suitable manner for the bearings 35 and the coil supports 36 as well as the coils 37.

In the manner described above, when high frequency current is momentarily passed through the coils 37, current is induced into the tube 25 and the resultant repelling magnetic field of the coils 37 and the current induced area of the tube 25 results in the outward repulsion of the tube 25 and the severing thereof along the annular cutting edge 41. It is to be understood that the tube 25 may be moved during the cutting operation.

In FIGURE 8 there is illustrated another form of magnetic impulse cutoff device generally referred to by the numeral 43 and being the reverse of that shown in FIGURE 7. The magnetic cutoff device 43 includes an inner anvil 44 which is carried by a horn extension 45 which, if desired, may be of a hollow construction for supplying coolant to portions of the anvil 44. The anvil 44 includes a bearing portion 46 which supports two rows of bearing elements 47 so as to accurately position the moving tube 25 as it passes over and around the anvil 44.

The anvil 44 also includes a cutoff portion 48 which is relieved as at 49 to define an annular step 50 which terminates at its external edge in a relatively sharp cutting edge 51. In the guidance of the tube 25 over the anvil 44, the tube 25 passes closely adjacent to the cutting edge 51.

The cutoff device 43 also includes an outer coil support 52 which carries a pair of coils 53 disposed in closely spaced relation longitudinally of the anvil 44 and encircling the anvil 44 generally in alignment with the cutting edge 51. When there is current flow through the coils 53, current is induced into the tube 25 and the two resultant repelling magnetic fields cause an inward forcing of the tube 25 at the cut edge 51 and the resultant movement of the tube 25 over the cutting edge 51.

In FIGURE 9 the moving tube 25 is illustrated in association with a magnetic impulse cutoff device, generally referred to by the numeral 54 which does not utilize an anvil in the cutoff operation thereof. The internal construction of the cutoff device 54 is the same as that of the cutoff device 33 and includes the support 34, a pair of bearing units 35 and a pair of longitudinally spaced annular coils 37 which are supported from the support 34 by means of coil supports 36. However, in lieu of the anvil 38, the cutoff device 54 is provided with an outer coil 55 which is of an annular outline and which is shaped so as to have a concentrated effect on the tube 25. The illustrated coil 55 is of a generally pointed construction with a squared off apex 56 being disposed generally between the longitudinally spaced coils 37.

In the operation of the cutoff device 54, current is simultaneously passed through the coils 37 and 55 with the result that the coils 37 induce currents into the tube 25 which produce magnetic fields of a repelling nature with respect to the magnetic fields set up by the flow of current through the coils 37 so as to force the tube 25 outwardly over a relatively wide area conforming generally to the overall width of the coil 55 and the longitudinal extent of the coil 55. At the same time, current flowing through the shaped coil 55 results in a concentrated induced current within the tube 25 intermediate the current induced in the tube 25 by the coils 37. The current induced by the coil 55 produces a magnetic field which is repellent relative to the magnetic field set up by the flow of current through the coil 55. As a result, the coils 37 produce an outward pressure on the tube 25 and the coil 55 produces a concentrated inward pressure on the tube 25 with the two pressures producing an internal shearing effect within the tube 25 sufficient to sever the tube 25.

In FIGURE 10 there is illustrated still another form of magnetic impulse cutoff device generally referred to by the numeral 57. The cutoff device 54 is also provided with an internal construction of the type shown in FIGURES 7 and 9. On the other hand, it combines broadly the features of the anvil 38 and the external coil 55. The cutoff device 57 includes an annular anvil 58 which encircles generally the coils 37. The anvil 58 is provided with an annular cutting edge 59 which is preferably centrally located intermediate the coils 37. The anvil 58 also carries at least one coil 60, there being two coils illustrated. When there are two coils 60, they are disposed on opposite sides of the cutting edge 59.

In the use of the cutoff device 57, current is first passed through the coils 37 so as to outwardly repel an aligned portion of the moving tube 25 in the manner described above with respect to FIGURES 7 and 9 so that the tube 25 is forced outwardly into engagement with the cutting edge 59 with sufficient force for the cutting edge 59 to sever the tube However, in accordance with the cutoff device 57, it is not desired that the tube 25 move beyond a position of cutoff on the cutting edge 59. It is merely desirable that cutting action be assured and by limiting the outward movement of the tube, the frictional force of the tube against the cutting edge 59 will be restricted. Therefore, the coils 60 will be energized at an appropriate time after the energization of the coils 37 so as to effect an inward repelling force on the tube 25 that will inhibit the approach of the tube against the cutting edge step or side face.

At this time it is pointed out that the locations of the coil structures shown in FIGURES 9 and 10 may be reversed as are the parts of the cutoff device 33 and the cutoff device 43. In other words, the components of the cutoff devices 54 and 47 may be reversed inside out.

Referring now to FIGURE 11, it will be seen that there is illustrated a form of the invention wherein the previously disclosed annular dies are mounted for movement with the tube 25. The cutoff device illustrated in FIGURES 11 and 12 is generally referred to by the numeral 61 and as is clearly shown in FIGURE 12, includes an internal mechanism which may correspond to the internal mechanism of the cutoff device 33. This internal mechanism includes a tubular support 62 on which there is mounted a pair of annular coils 63 which are disposed in longitudinally spaced relation and are supported by means of a pair of coil supports 64. In addition, the support 62 may carry suitably bearing units (not shown) which correspond to the bearing units 35. Coolant may flow through the support 62 for the purpose of cooling the bearing units and the coils in the manner described with respect to the support 34.

Each of the anvils is formed of a pair of complementary anvil halves 65, 66. Each of the anvil halves is of a stepped construction to define a step 67 and a cutting edge 68, as is shown in FIGURE 12 with respect to an anvil half 65.

Referring once again to FIGURE 11, it will be seen that a plurality of anvil halves 65 is carried by an endless conveyor member 69 which is mounted on suitable supports 70 and which is driven at the same linear rate as is the tube 25. A similar endless conveyor member 71 carries a plurality of the anvil halves 66 and is mounted for movement on suitable conventional supports 72. The endless conveyor member 71 is suitably driven in any conventional manner in exact timed relation with respect to the endless conveyor member 69 so that the anvil halves 65 and 66 are in alignment and cooperating relation when the anvil halves 65 and 66 pass the coils 63. If desired, any type of interlock may be provided between the anvil halves 65 and 66 to assure the full cooperation thereof.

Referring now to FIGURE 13 in particular, it will be seen that there is illustrated a magnetic impulse cutoff device which is generally referred to by the numeral 73. The cutoff device 73 includes an internal construction which corresponds to the internal construction of the cutoff devices 33 and 61 and includes a support, such as the tubular support 62, which carries a pair of annular coils 63 which are mounted in longitudinally spaced relation by means of a pair of coil supports 64. It is to be understood that the tube 25 may be guided by means of suitable bearing units (not shown) which may be similar to the bearing units 35 and mounted on the support 62.

An annular anvil 74 is positioned externally of the path of the tube 25 during the cutting operation. The anvil 74 is of a stepped construction and includes a step 75 which terminates at its inner edge in a cutting edge 76.

The anvil 74 is floatingly supported by means of a diaphragm 77. The diaphragm 77 is formed of a thin resistent material, preferably metallic material, and is carried by a fixed outer support ring 78. The inner edge of the diaphragm 77 is connected to an inner ring 79 which is suitably secured to the anvil 74. In addition, an electrically conductive ring 80 is secured to the ring 79 with the ring 80 being preferably formed of a material which is highly conductive, such as copper.

The cutoff device 73 also includes an annular support 81 in which there is mounted a coil 82. In accordance with this invention, it is proposed to energize the coil 82 simultaneous with the energization of the coil 63. Thus as the coil 63 functions to repel the tube 25 outwardly, the coil 82 functions to repel the ring 80 and thus the anvil 74 longitudinally in the same direction as the movement of the tube 25 and at the same rate at the time the tube 25 is forced into engagement with the anvil 74. It is to be understood that the specific construction of the coil 82, as well as the ring 80, the anvil 74 and the diaphragm 77 will be varied to obtain this relative close relationship.

Reference is now made to FIGURE 14 wherein there is illustrated still another form of magnetic impulse cutoff device which is generally referred to by the numeral 83. The cutoff device 83 is provided with a suitable internal coil assembly which is illustrated as including a tubular support 84 which will be carried by the horn of the apparatus for forming the tube 25. The support 84 is illustrated as supporting a single coil 85 by means of a coil support 86. However, it is to be understood that the support 84 may carry two coils 85 and two coil supports 86, if it is so desired. In addition, the support 84 will normally carry bearing units similar to the bearing units 35 for the purpose of guiding the tube 25.

The cutoff device 83 also includes an outer supporting ring 87 which is fixedly mounted and which supports for rotation a ring 88 by means of suitable bearings 89. The ring 88 is illustrated as having a retaining collar 90 threadedly engaged thereon for the purpose of retaining the bearings 89 in place. One end of the ring 88 is provided with a drive gear 91 which may be driven in any desired suitable manner in timed relation to the movement of the tube 25.

The ring 88 carries a cam follower 92 which is engaged in a cam track 93 of a cam ring 94. The cam ring 94 is mounted for reciprocatory movement within the ring 88 and is prevented from rotating by a plurality of fingers 95 which have end portions disposed in slots 96 in the support ring 87. The cam ring 94 carries an anvil 97 which is retained in place by a threaded ring 98. The anvil 97 is of the stepped type and has a step 99 which terminates in a cutting edge 100. The cutting edge 100 is annular in outline and is aligned with the coil 85 at the time the coil 85 is energized.

It will be readily apparent that since the ring 88 is rotated in timed relation to the movement of the tube 25, and the coil 85 is energized when the anvil 97 is properly positioned with respect to the coil 85, equal lengths will be cut from the tube 25 as it moves through the cutoff device 83.

Reference is now made to FIGURE 5 wherein there is illustrated a simplified wiring diagram for the operation of a typical coil in accordance with this invention. For descriptive purposes only, the coil is referred to by the numeral 101. The coil 101 is part of an electrical circuit which includes a high voltage transformer 102 which is connected to any conventional alternating current source. One output lead 103 of the transformer 102 is connected to a charge ignitron 104 of a conventional type. The other output lead 105 of the transformer 102 has a resistor 106 connected thereto. The resistor 106 is in turn connected to an electric conductor 107. The charge ignitron 104 is connected to a series ignitron 108 by means of a conductor 109. An energy storage capacitor 110 is connected between the conductors 107 and 109.

A conductor 111 is connected to the cathode end of the series ignitron 108. A crowbar ignitron 112 of a conventional type is mounted across the conductors 107 and 111 in parallel to the coil 101 which is connected between the conductors 107 and 111. The capacitor 110, the series ignitron 108 and the crowbar ignitron 112 are coaxially built. The firing or energization of the coil 101 is controlled through the series ignitron 108. This is accomplished by means of a conventional type of ignitron firing device 113 which may be energized by any type of control device 114 which is coupled to the ignitron firing device 113 through an energizer 115. The control device may be in the form of a reflex type photoelectric device, which may be in the form of a switch which is operated in timed relation to a mechanically driven mechanism, as in the case of the cutoff device 83, or any other suitable type of control device may be utilized. Since the control device per se in no way forms a part of this invention, and since the control device may be of numerous conventional types, no attempt will be made here to specifically describe a typical control device.

Reference is again made to the cutoff device 54 of FIGURE 8. It is pointed out that in the forming of the shaped coil 55, high permeability concentrators could be effectively employed to narrow the circumferential region in which current is induced and wherein a repelling force is generated on the tube 25. The shearing action of the repelling forces can be extremely intense and it is not necessary to synchronize inside and outside pulses in time in order to achieve cutting action. For example, in certain instances there may be desirable support coils 37 to be first energized or fired, with the energization of the coil 55 being delayed for a brief period in order that the tube 25 under the action of the inside force from the coils 37 may approach more closely the neighborhood of the most intense field of the tube 25. It is to be understood that suitable control mechanisms having minute time delay means therein may be utilized.

It is also desired here to point out more specifically the advantages of the cutoff devices incorporating the moving anvils as compared to the cutoff device incorporating the fixed anvils. Assuming that the tube to be cut off is moving at the rate of 1000 feet per minute, this is 200 inches per second or 0.2 mils per microsecond. Since it is desired to cut off a predetermined length of tube with great accuracy, on an average of ±2 mils, the cut off must be accomplished in 10 microseconds.

On a slightly different basis, if the tube is moving with a linear velocity of 200 inches per second, it may be desired to have a radial velocity of the material towards and across the cutoff edge of ten times the linear velocity or 2000 inches per second. Since the travel distance may only be about 0.010 inch, that is slightly greater than the thickness of the material of the tube, there is a time of about 5 microseconds that the tube travels forward during the cut with there being a travel time of about 1/10 of this or 0.5 microseconds actually required to accomplish the cutting. Thus the cutting time may be between 0.5 to 10.0 microseconds for accurate cutoff.

In the cutoff devices where the cutting edge is moving, the velocity equal to or slightly greater than the velocity of the moving tube, much more time can be made available for the actual cutting operation. It may be assumed that the cutting edge for a period of time just prior to and just after cutting is either moving at the same velocity as or slightly overtaking the point to which it is desired that cutoff be made. If desired to allow 100 microseconds for cutting, it is necessary to track the tube for a period of time comparable to this to assure proper cut off.

This invention is in no way limited to the cutting of metals alone. It is to be understood that composite materials, for example, those involving laminates of metal and plastics or paper, may be used equally as well as metal strips and tubes.

Although several preferred embodiments of the invention have been specifically illustrated and described herein, it is to be understood that other minor variations may be made in the principle of magnetic impulse cutoff devices within the spirit and scope of this invention, as defined in the appended claims.

I claim:

1. In the method of effecting the separation of a moving conductive section into individual elements, the steps of moving the conductive section between a coil and a co-operating work member, and rapidly passing a pulse of high current through the coil to induce an opposite and repelling force into the conductive section with the conductive section being repelled from the coil towards the cooperating work member and a shearing force is placed on the moving conductive section.

2. The method of claim 1 wherein the shearing force is insufficient to effect the severing of the conductive section and work performed on the conductive section is limited to a scoring of the conductive section as a first step in the eventual separation of the conductive section.

3. The method of claim 1 wherein the work member includes a back-up portion and the relative shearing movement of adjacent portions of the conductive section is less than the thickness of the conductive section to restrict the shearing of the conductive section to a scoring of the conductive section.

4. The method of claim 1 together with the step of moving the work member in unison with the conductive section past the coil.

5. The method of claim 1 wherein the work member is in the form of a shaped coil and a second pulse of high current is passed through the shaped coil in timed relation to the passage of current through the first mentioned coil whereby the coils produce opposite shearing forces in the conductive section.

6. The method of claim 5 wherein a pulse of current is passed through the shaped coil after a very short time delay whereby the effective force of the shaped coil on the conductive section is a maximum.

7. The method of claim 6 wherein a fixed shearing die is associated with the shaped coil and the shearing action on the conductive section is partially mechanical and partially the result of opposite repulsion forces and frictional engagement of the conductive section with the shearing die being held to a minimum by the repulsion effect of the shaped coil.

8. A method of separating a tube into individual tubular elements comprising the steps of moving the tube between a coil and a cooperating work member, and rapidly passing a pulse of high current through the coil to induce an opposite and repelling force around the tube with the tube being circumferentially repelled from the coil towards the cooperating work member and a shearing force is placed around the tube.

9. The method of claim 8 together with the step of moving the work member in unison with the tube past the coil.

10. The method of claim 8 wherein the work member is in the form of a shaped coil and a second pulse of high current is passed through the shaped coil in timed relation to the passage of current through the first mentioned coil whereby the coils produce opposite shearing forces in the tube.

11. An apparatus for applying a shearing force to a moving thin sheet material conductive member comprising a conductor shaped to provide a predetermined magnetic field, a die having a shearing edge opposing said conductor and being spaced therefrom for the movement of a thin sheet material member between said die and said conductor, and means for applying a predetermined current pulse through said conductor of a strength and time length to produce a magnetic field capable of forcing the thin sheet material member against said die to effect at least a partial shearing of the thin sheet material member.

12. An apparatus for applying a shearing force to a moving thin sheet material conductive member comprising a conductor shaped to provide a predetermined magnetic field, a die having a shearing edge opposing said conductor and being spaced therefrom for the movement of a thin sheet material member between said die and said conductor, and means for applying a predetermined current pulse through said conductor of a strength and time length to produce a magnetic field capable of forcing the thin sheet material member against said die to effect at least a partial shearing of the thin sheet material member in timed relation to the movement of the thin sheet material member.

13. An apparatus for applying a shearing force to a moving thin sheet material conductive member comprising a conductor shaped to provide a predetermined magnetic field, a back-up member opposing said conductor and being spaced therefrom for the movement of a thin sheet material member between said conductor and said back-up member, said back-up member being cooperable with said conductor to impose a shearing force on a conductive member passing therebetween, and means for applying a predetermined current pulse through said conductor of a strength and time length to produce a magnetic field capable of forcing the thin sheet material member towards said back-up member to effect at least a partial shearing of the thin sheet material member.

14. An apparatus for shearing a moving thin walled conductive tube comprising a coil shaped to form a magnetic field corresponding to the cross section of the tube, a cooperating back-up member shaped similarly to said coil and being spaced therefrom for the movement of the tube between said coil and said back-up member, and means for applying a predetermined current pulse through said coil of a strength and time length to produce a magnetic field capable of forcing a local portion of the tube towards said back-up member to effect a severance of the tube.

15. The apparatus of claim 4 wherein said back-up member is in the form of a die having a shearing edge.

16. The apparatus of claim 14 wherein said back-up member is in the form of a die having a shearing edge, and means mounting said die for momentary movement with the tube.

17. The apparatus of claim 14 wherein said backup member is in the form of a die having a shearing edge, and rotary cam means mounting said die for momentary movement with the tube.

18. The apparatus of claim 14 wherein said backup member is in the form of a die having a shearing edge, said die being in the form of cooperating halves, and endless conveyor means carrying said die halves in unison and alongside the moving tube in unison therewith during a portion of the travel of said die.

19. The apparatus of claim 14 wherein said backup member is in the form of a die having a shearing edge, a diaphragm supporting said die for momentary movement with the tube, and a second coil for controlling the movement of said die.

20. The apparatus of claim 14 wherein said backup member is in the form of a shaped coil for effecting an opposite and shearing force relative to said first coil force.

21. The apparatus of claim 14 wherein said backup member is in the form of a shaped coil for effecting an opposite and shearing force relative to said first coil force, and means for energizing said shaped coil in timed relation to the energization of the first coil.

22. The apparatus of claim 14 wherein said backup member includes a die and a coil for effecting an opposite and shearing force relative to said first coil force.

23. The apparatus of claim 14 wherein said backup member includes a die and a coil for effecting an opposite and shearing force relative to said first coil force to limit the movement of the tube relative to said die.

24. The apparatus of claim 14 wherein said coil is carried by a support extending from a horn of a tube forming apparatus, and tube guide means are carried by said support.

25. An apparatus for shearing a moving thin walled conductive tube comprising a pair of coils spaced in the direction of tube travel to form at least one magnetic field corresponding to the cross section of the tube, a cooperating anvil having a cutting edge disposed centrally of said coils, said cutting edge having a shape corresponding to the cross section of the tube and being spaced from said coils for the passage of the tube therebetween, and means for applying a predetermined current pulse through said coils of a strength and time length to produce a magnetic field capable of forcing a local portion of the tube against said cutting edge to effect a severance of the tube.

26. The apparatus of claim 25 wherein said coils are internally of the path of tube movement and said cutting edge is externally thereof.

27. The apparatus of claim 25 wherein said cutting edge is internally of the path of tube movement and said coil is externally thereof.

References Cited by the Examiner

UNITED STATES PATENTS

| | | | |
|---|---|---|---|
| 1,777,802 | 10/1930 | Maltby | 83—318 X |
| 2,033,789 | 3/1936 | Rose | 83—318 |
| 2,484,854 | 10/1949 | Peters | 83—183 |
| 2,600,254 | 6/1952 | Lysobey | 93—58.2 |
| 2,976,907 | 3/1961 | Harvey et al. | 153—10 |
| 3,088,200 | 5/1963 | Birdsall et al. | |
| 3,092,165 | 6/1963 | Harvey | 29—421 |
| 3,126,937 | 3/1964 | Brower et al. | 29—421 |
| 3,171,014 | 2/1965 | Ducati | 219—149 |
| 3,175,383 | 3/1965 | Levine | 29—421 |

OTHER REFERENCES

A. P. Langlois, Electromagnetic Metal Forming, The Tool and Manufacturing Engineer, pages 105–108, May 1961. (Copy in Cl. 113–44E.)

D. F. Brower, Magnetic-Pulse Forming, Society of Automotive Engineers, Paper No. 479B, January 8–12, 1962. (Copy in Cl. 113–44F.)

George De Groat, When To Use Magnetic Forming, Metal Working Production, July 3, 1963. (Copy in Cl. 72–56.)

WILLIAM W. DYER, Jr., *Primary Examiner.*

ANDREW R. JUHASZ, *Examiner.*

L. B. TAYLOR, *Assistant Examiner.*